D. H. KING & W. M. HULSE.
Equalizing Attachments for Plows.

No. 140,632. Patented July 8, 1873.

Witnesses:
P. C. Dieterich
Sedgwick

Inventor:
D. H. King
W. M. Hulse
Per
Attorneys.

AM. PHOTO-LITHOGRAPHIC CO. N.Y. (OSBORNE'S PROCESS.)

UNITED STATES PATENT OFFICE.

DAVID H. KING AND WILLIAM M. HULSE, OF PALMYRA, ILLINOIS.

IMPROVEMENT IN EQUALIZING ATTACHMENTS FOR PLOWS.

Specification forming part of Letters Patent No. 140,632, dated July 8, 1873; application filed March 29, 1873.

*To all whom it may concern:*

Figure 1:
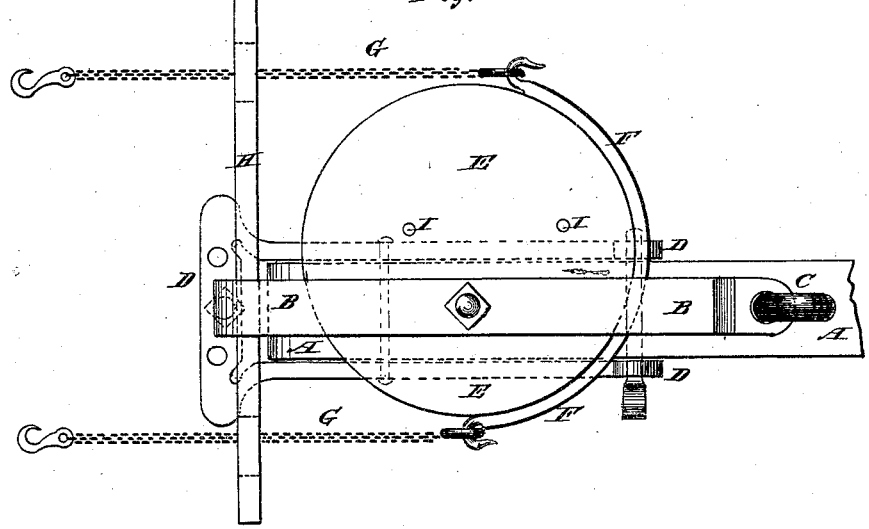
Figure 2:
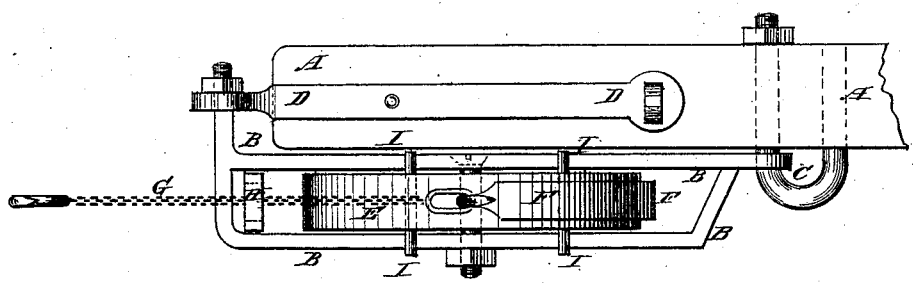

Be it known that we, DAVID H. KING and WILLIAM M. HULSE, of Palmyra, in the county of Macoupin and State of Illinois, have invented a new and useful Improvement in Eccentric Three-Horse Equalizer, of which the following is a specification:

Figure 1 is a side view of our improved equalizer. Fig. 2 is a top view of the same.

Similar letters of reference indicate corresponding parts.

The invention consists in an improved metallic-loop attachment for holding the equalizing apparatus of a plow, and also in applying a guard-bar to the chains used in equalizers, as hereinafter described and claimed.

A represents a plow-beam, upon the landside of which is placed a loop, B, closed at both ends. The inner side bar of the loop B projects at the rear end, and has a hole formed in it to receive a hook-bolt, C, which passes through the beam A, and is secured in place by a nut. The loop B is so arranged that its forward end may project a little beyond the end of the beam A. The front end bar of the loop B projects inward, and passes through one of the holes or notches of the clevis D, where it is secured in place by a nut, so that by removing the said nut the forward end of the loop may be raised or lowered to cause the plow to run deeper or shallower in the ground. The clevis D is an ordinary clevis, and is attached to the beam A in the ordinary manner. E is a small wheel which is pivoted eccentrically in and to the loop B by a bolt. To the rear edge of the wheel E is attached a strap, F, extending about half-way around the said wheel, one end terminating at or near the longest radius of said wheel and the other at or near the shortest radius. Upon the ends of the strap F are formed hooks to receive the ends of two chains, G, upon the other ends of which are formed hooks to receive the draft-bars. To the forward end of the loop B is attached a short vertical bar, H. The upper and lower parts of the bar H are slotted to receive the chains G, and prevent them from being drawn out of line with the plane of the wheel E. To the chain C, connected with the wheel E at its shortest diameter, is attached a long double-tree, with the ends of which are connected the whiffletrees of the off and near horses. The whiffletree of the central horse is connected with the other chain G. The wheel E is kept from turning so far that any one of the horses may have more than his own share of the draft by two pins, I, attached to it in front and rear of its center, and at such a distance above the loop B as will allow sufficient play.

Having thus described our invention, we claim as new and desire to secure by Letters Patent—

1. The loop B, closed at both ends, and secured to the beam by the bolt C and clevis D, to hold the equalizing mechanism, in the manner described.

2. The combination, with the chains attached to a band, F, movable on an eccentric, E, of the guide-bar H, applied as and for the purpose set forth.

DAVID H. KING.
WILLIAM M. HULSE.

Witnesses:
STERLING BERRY,
GEORGE TRUSDALL.